US008774307B2

(12) United States Patent
Kim et al.

(10) Patent No.: US 8,774,307 B2
(45) Date of Patent: Jul. 8, 2014

(54) METHOD OF TRANSMITTING SIGNAL AND METHOD OF RECEIVING SIGNAL

(75) Inventors: Jihyung Kim, Daejeon (KR); Wooram Shin, Daejeon (KR); Dong Seung Kwon, Daejeon (KR); Ju Hyup Kim, Gyeonggi-do (KR); Een Kee Hong, Gyeonggi-do (KR)

(73) Assignees: Samsung Electronics Co., Ltd., Suwon-si (KR); Electronics and Telecommunications Research Institute, Daejeon (KR)

(*) Notice: Subject to any disclaimer, the term of this patent is extended or adjusted under 35 U.S.C. 154(b) by 260 days.

(21) Appl. No.: 13/001,324

(22) PCT Filed: Jun. 25, 2009

(86) PCT No.: PCT/KR2009/003437
§ 371 (c)(1),
(2), (4) Date: Dec. 23, 2010

(87) PCT Pub. No.: WO2009/157723
PCT Pub. Date: Dec. 30, 2009

(65) Prior Publication Data
US 2011/0116570 A1    May 19, 2011

(30) Foreign Application Priority Data

Jun. 26, 2008  (KR) .......... 10-2008-0060668
Jun. 23, 2009  (KR) .......... 10-2009-0056119

(51) Int. Cl.
*H04L 27/00* (2006.01)
(52) U.S. Cl.
USPC ........................................ 375/295

(58) Field of Classification Search
USPC ................................. 370/254–340
See application file for complete search history.

(56) References Cited

U.S. PATENT DOCUMENTS 8,326,307 B2 * 12/2012 Arad et al. .......... 455/446
2007/0087772 A1 *  4/2007 Yi et al. ............. 455/522

(Continued)

FOREIGN PATENT DOCUMENTS

EP    1 906 611 A1    4/2008
EP    1 926 217 A2    5/2008

OTHER PUBLICATIONS

Notification of Transmittal of the International Search Report and Written Opinion of the International Searching Authority, or the Declaration dated Nov. 24, 2010 in connection with PCT Patent Application No. PCT/KR2009/003437.

(Continued)

*Primary Examiner* — Ayaz Sheikh
*Assistant Examiner* — Debebe Asefa

(57) ABSTRACT

In a multicell communication system, a terminal that belongs to a second cell using the same subcarrier as a terminal that belongs to a first cell changes a pilot in an allocated basic resource block. Then, a base station that manages the first cell can estimate a channel of an interference signal transmitted from a second cell from a reception signal even though the reception signal includes an interference signal from the terminal that belongs to the second cell at the time of receiving a signal transmitted from the terminal that belongs to the first cell. Further, the base station that manages the first cell may reduce an interference signal from a reception signal by using a channel estimation value.

20 Claims, 6 Drawing Sheets

(56) References Cited

U.S. PATENT DOCUMENTS

| | | |
|---|---|---|
| 2007/0223606 A1 | 9/2007 | Yang et al. |
| 2008/0075185 A1 | 3/2008 | Park et al. |
| 2008/0076407 A1* | 3/2008 | Shitara .......................... 455/424 |
| 2009/0059859 A1* | 3/2009 | Kuze et al. .................... 370/329 |
| 2009/0116449 A1* | 5/2009 | Kishiyama et al. ........... 370/331 |
| 2009/0186621 A1* | 7/2009 | Umeda et al. ................. 455/446 |

OTHER PUBLICATIONS

Draft Standard for Local and metropolitan area networks, "Part 16: Air Interface for Broadband Wireless Access Systems", IEEE WirelessMan 802.16, Feb. 2008, 1880 pages.

\* cited by examiner

Fig. 1
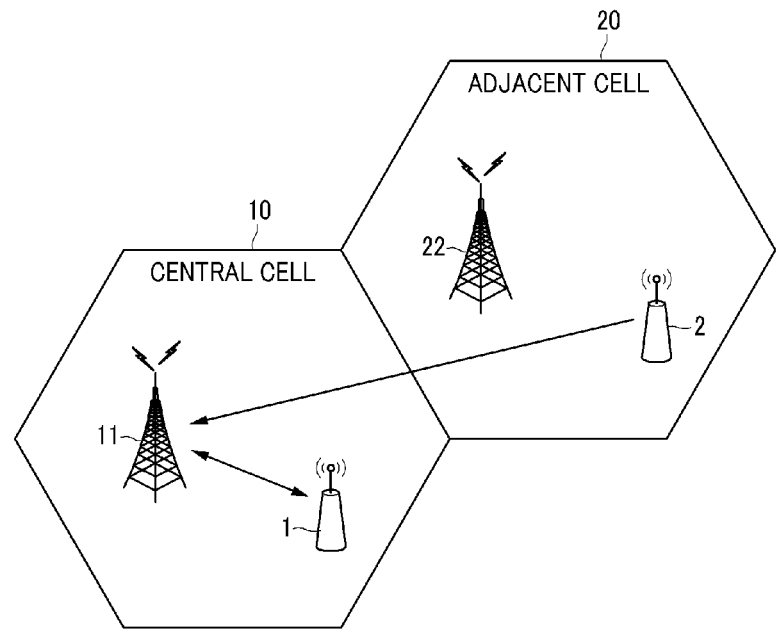
Fig. 2
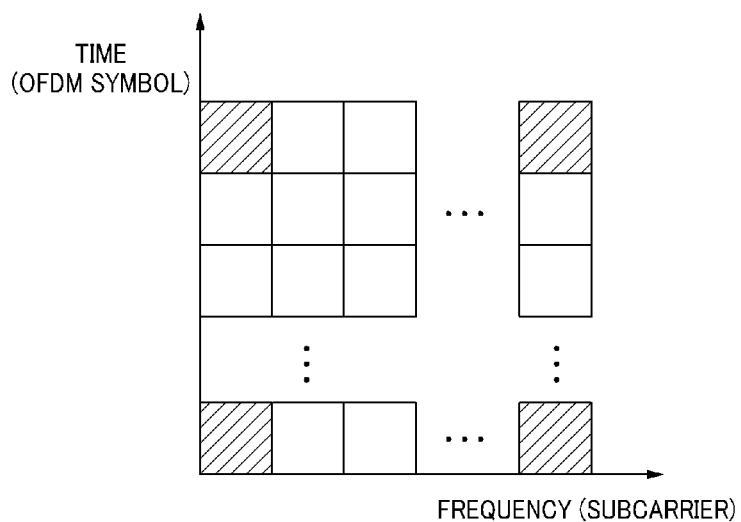
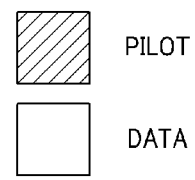 PILOT
DATA

Fig. 3
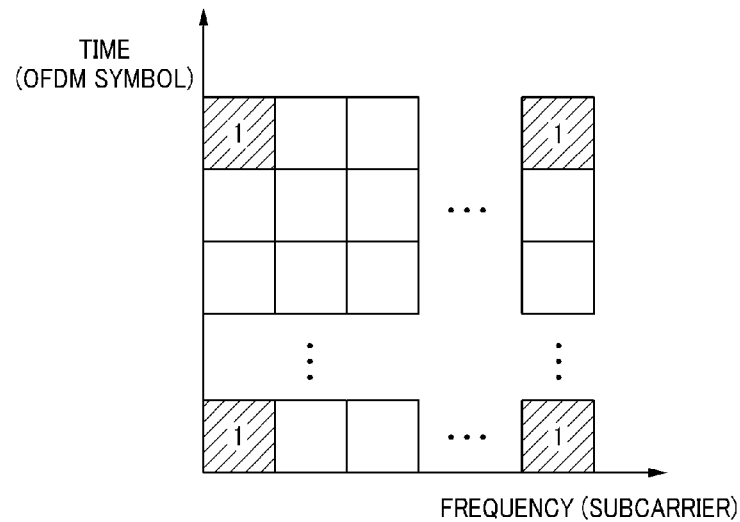
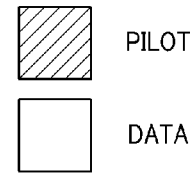
Fig. 4
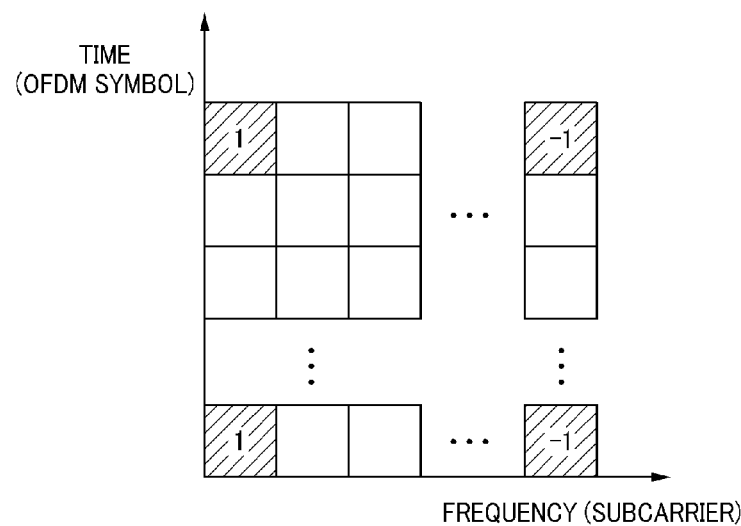
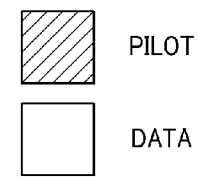

Fig. 5
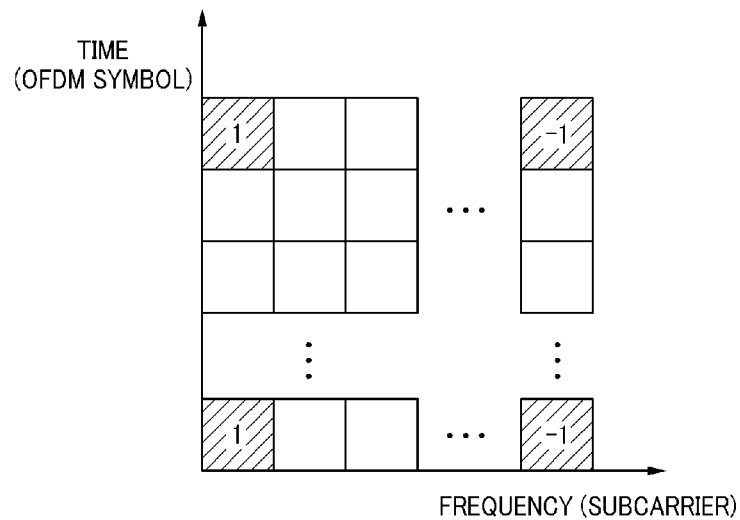
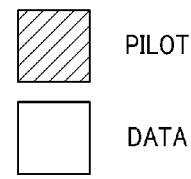
Fig. 6
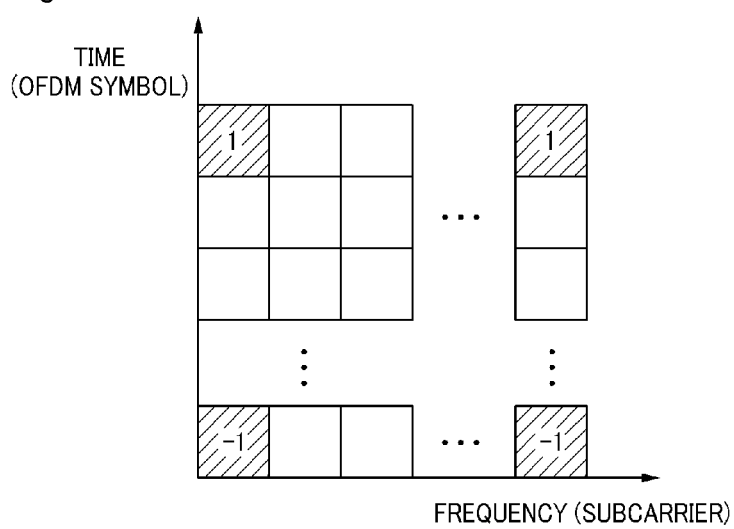
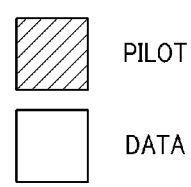

Fig. 7
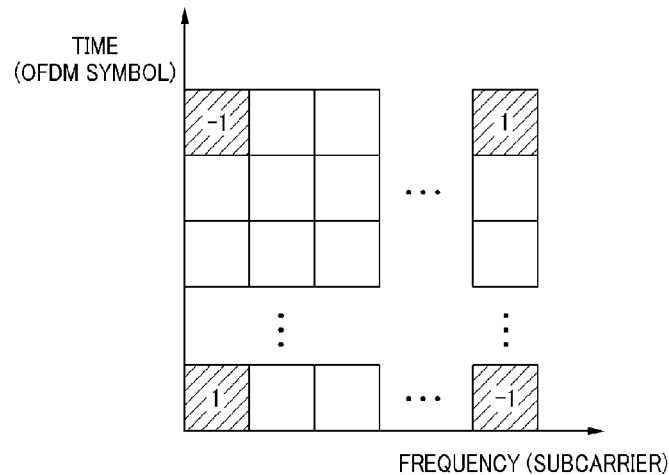
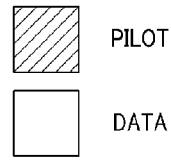
PILOT
DATA
Fig. 8
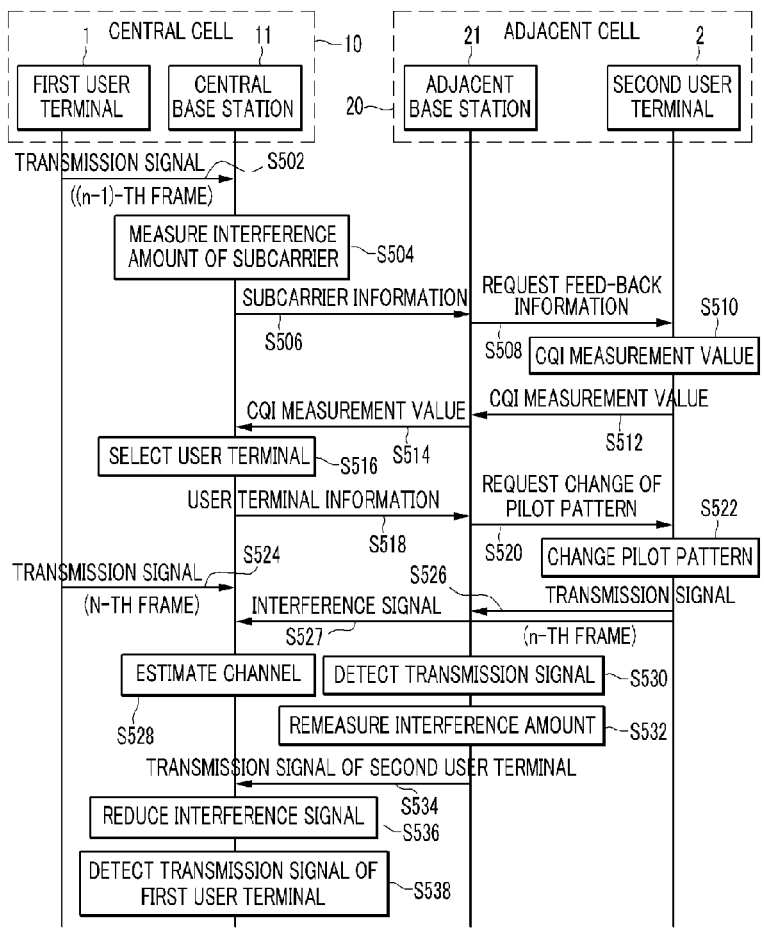

METHOD OF TRANSMITTING SIGNAL AND METHOD OF RECEIVING SIGNAL

CROSS-REFERENCE TO RELATED APPLICATION(S)

The present application claims priority under 35 U.S.C. §365 to International Patent Application No. PCT/KR2009/003437 filed Jun. 25, 2009, entitled "METHOD OF TRANSMITTING SIGNAL AND METHOD OF RECEIVING SIGNAL". International Patent Application No. PCT/KR2009/003437 claims priority under 35 U.S.C. §365 and/or 35 U.S.C. §119(a) to Korean Patent Application No. 10-2008-0060668 filed Jun. 26, 2008 and Korean Patent Application No. 10-2009-0056119 filed Jun. 23, 2009 which are incorporated herein by reference into the present disclosure as if fully set forth herein.

TECHNICAL FIELD

The present invention relates to a method of transmitting a signal and a method of receiving a signal. More particularly, the present invention relates to a method of transmitting a signal and a method of receiving a signal for removing interference signals of adjacent cells.

BACKGROUND ART

An orthogonal frequency division multiplexing (OFDM) system is a transmission system that can effectively reduce selective frequency fading due to a delay spread by dividing one high-speed data stream into multiple low-speed data streams and transmitting the multiple low-speed data streams at the same time by using inter-orthogonal subcarriers.

An orthogonal frequency division multiple access (OFDMA) system, which is one of multiple access systems based on the OFDM system, can independently allocate one or more subcarriers to each user at a user request. Subchannels set as a group of the subcarriers are basic frequency resource units allocated to users. Since the subchannels are physically independent from each other, multiple access interference is not generated in the same cell.

However, in an OFDMA multiple cell system, interference which base stations that manage cells adjacent to one cell (hereinafter referred to as "central cell") give to a user who uses the central cell, i.e., inter-cell interference (ICI), occurs. In order to reduce the inter-cell interference, not only a channel of the central cell but also channels of signals transmitted from the adjacent cells need to be estimated. That is, the OFDMA system needs to estimate the channel by considering interference caused by the adjacent cells.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method of transmitting a signal and a method of receiving a signal having advantages of estimating a channel by considering interference caused by adjacent cells, and reducing the interference.

Technical Solution

An exemplary embodiment of the present invention provides a method of transmitting a signal of a terminal which belongs to an adjacent cell in a multicell communication system including a central cell and an adjacent cell adjacent to the central cell. The method of transmitting a signal includes: allocating a plurality of first pilots having a first value depending on a pilot pattern set in a first basic resource block having a plurality of subcarriers of a frequency axis and a plurality of orthogonal frequency division multiplexing (OFDM) symbols of a time axis; determining whether or not a transmission signal operates as an interference signal in the central cell; when the transmission signal operates as an interference signal in the central cell, changing values of some first pilots among the plurality of first pilots to a second value different from the first value; and transmitting the transmission signal through a first basic resource block in which the values of some first pilots are changed.

Another embodiment of the present invention provides a method of transmitting signals of a plurality of terminals that each belong to a plurality of adjacent cells in a multicell communication system in which transmission signals of the plurality of adjacent cells operate as interference signals in a central cell. The method of transmitting a signal includes changing a first pilot so that a subcarrier where at least one first pilot allocated to a first basic resource block is positioned and a subcarrier where at least one second pilot allocated to a second basic resource block of a terminal which belongs to the central cell is positioned are orthogonal to each other, and transmitting the transmission signals through the first basic resource block allocated to the changed first pilot.

Yet another embodiment of the present invention provides a method of receiving a signal of a base station which manages a central cell in a multicell communication system in which interference is generated between the central cell and an adjacent cell adjacent to the central cell. The method of receiving a signal includes receiving a first pilot from a first user terminal that belongs to the central cell through at least one first subcarrier, receiving a second pilot having a different value from the first pilot from a second user terminal that belongs to the adjacent cell through at least one second subcarrier, and estimating channels of signals transmitted from the first and second user terminals by using the first and second pilots.

Still another embodiment of the present invention provides a method of receiving a signal of a base station which manages a central cell in a multicell communication system in which a signal of an adjacent cell adjacent to the central cell operates as interference signal in the central cell. The method of receiving a signal includes: receiving a first signal transmitted from a first user terminal that belongs to the central cell through a first basic resource block; estimating channels with the first and second user terminals by using the first signal; receiving a second signal transmitted from the second user terminal that belongs to the adjacent cell through a second basic resource block from a base station of the adjacent cell; reducing an interference signal caused by the second user terminal from the first signal by using the second signal and the channel estimation value with the second user terminal; and detecting the first signal from the signal from which the interference signal is reduced by using the channel estimation value with the first user terminal. At this time, pilots having different values are allocated to the first and second basic resource blocks.

Advantageous Effects

According to an embodiment of the present invention, it is possible to reduce interference caused by adjacent cells by estimating not only a channel of a cell to which a terminal belongs but also channels transmitted from the adjacent cells, thereby improving the performance of the cell.

BRIEF DESCRIPTION OF DRAWINGS

FIG. 1 is a schematic diagram illustrating a communication system according to an exemplary embodiment of the present invention;

FIG. 2 is a diagram illustrating basic resource blocks of a wireless resource;

FIGS. 3 and 4 are diagrams illustrating a pilot pattern of an adjacent cell before a change and a changed pilot pattern;

FIGS. 5 to 7 are diagrams illustrating a changed pilot pattern of a user terminal which belongs to three adjacent cells; and FIGS. 8 to 10 are flowchart illustrating a method of reducing interference signals caused by adjacent cells according to first to third embodiments of the present invention.

MODE FOR THE INVENTION

Figure 9:
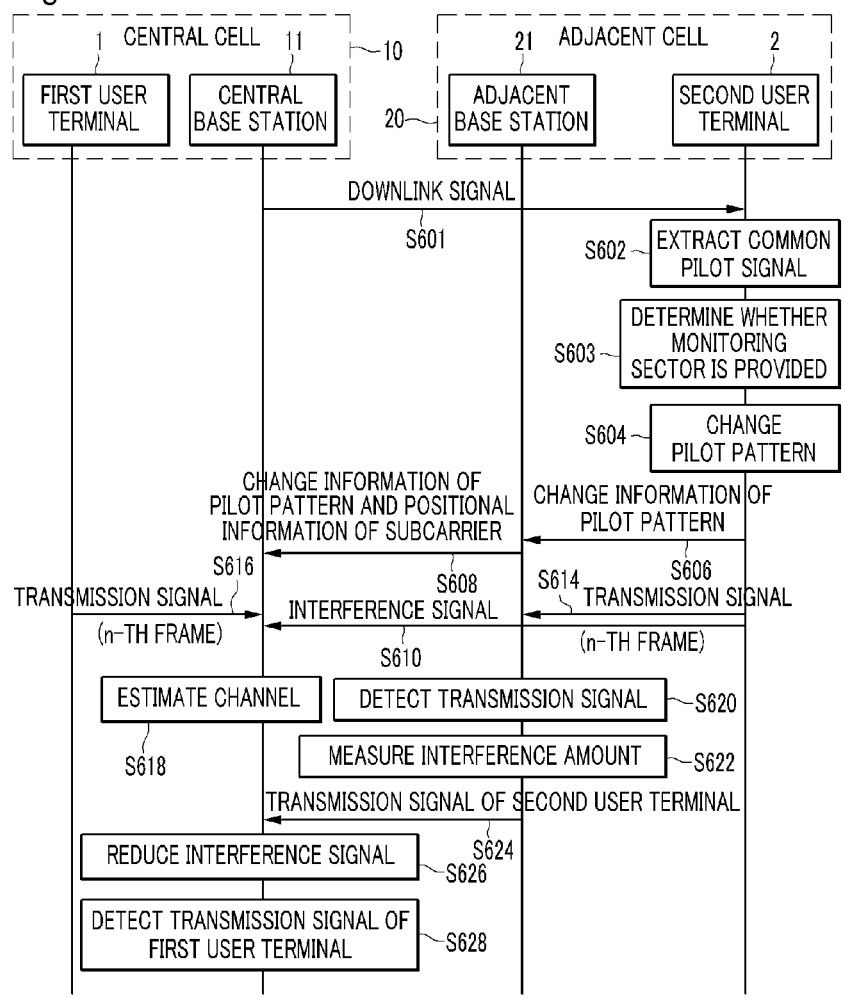

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising", will be understood to imply the inclusion of stated elements but not the exclusion of any other elements. Further, terms such as "-unit", "-er", "module", "block", etc. mean units that processes at least one function or operation and can be implemented by hardware or software or a combination of hardware and software.

Hereinafter, a method of transmitting a signal and a method of receiving a signal according to an exemplary embodiment of the present invention will be described in detail with reference to the accompanying drawings.

FIG. 1 is a schematic diagram illustrating a communication system according to an exemplary embodiment of the present invention, and FIG. 2 is a diagram illustrating basic resource blocks of a wireless resource.

Referring to FIG. 1, a plurality of cells 10 and 20 are formed in a communication system according to an exemplary embodiment, and one base station 11 or 21 for managing the corresponding cell is formed in each cell 10 or 20. A user terminal 1 or 2 that is positioned each cell 10 or 20 communicates with the base station 11 or 21 that manages each cell 10 or 20 by using a wireless resource of an uplink/downlink frame. In FIG. 1, two cells 10 and 20 are illustrated for convenience of description. Hereinafter, the first cell 10 is referred to as a central cell 10, and the base station 11 for managing the central cell 10 is referred to as a central base station 11. Further, the second cell 20 adjacent to the first cell 10 is referred to as an adjacent cell 20, and the base station 21 for managing the adjacent cell 20 is referred to as an adjacent base station 21.

Referring to FIG. 2, the wireless resource of the uplink/downlink frame is constituted by a plurality of basic resource blocks. Each of the basic resource blocks is constituted by a plurality of subcarriers of a frequency axis and a plurality of OFDM symbols of a time axis. Data for each user terminal is allocated to each basic resource block and pilots of a predetermined number, which are used for channel estimation, are allocated to each basic resource block. Therefore, the user terminals 1 and 2 transmit the data and pilot signals through the basic resource blocks.

In general, in the communication system, distortion is generated in a transmission signal due to multipath attenuation. A receiver estimates a channel value of a relevant channel by using a pilot in the basic resource block, and detects a data signal by using the channel value in order to estimate and compensate the distortion. That is, the receiver estimates a channel value used for data transmission by using interpolation after extracting a pilot from a reception signal and obtaining a channel value corresponding to the position of the pilot through a channel estimation technique. Herein, the pilot is a signal of a structure of which a transmitter and the receiver agree, and the pilot is allocated to some subcarriers of the basic resource block.

However, in the multicell communication system of FIG. 1, an interference signal of the second user terminal 2 that is positioned in the adjacent cell 20 may be transmitted to the central cell 10. That is, in the case when one or more subcarriers among the subcarriers allocated to the basic resource blocks of the first and second user terminals 1 and 2 are the same as each other, the interference signal of the second user terminal 2 that is positioned in the adjacent cell 20 influences the subcarrier allocated to the first user terminal 1 that communicates with the central base station 1 by the same subcarrier, and the receiver of the central base station 11 receives a signal formed by adding the interference signal of the second user terminal 2 to the transmission signal of the first user terminal 1.

In order to recover the transmission signal of the first user terminal 1 from the signal formed by adding the interference signal of the second user terminal 2 to the transmission signal of the first user terminal 1, the receiver of the central base station 11 must estimate a channel with the second user terminal 2 that is positioned in the adjacent cell 20 as well as a channel with the first user terminal 1 that belongs to the central cell 10.

In the exemplary embodiment, the transmitter of the user terminal 2 that is positioned in the adjacent cell 20 changes a pilot pattern in the basic resource block allocated to the user terminal 2 so that the receiver of the central base station 11 can estimate the channel with the user terminal 2 that is positioned in the adjacent cell 20 as well as the channel with the first user terminal 1 that belongs to the central cell 10.

Therefore, the receiver of the central base station 11 can estimate the channel with the first user terminal 1 and the channel with the second user terminal 2 to thereby detect the transmission signal of the first user terminal 1 by reducing the interference signal of the second user terminal 2 from the reception signal.

Hereinafter, assuming that the first and second user terminals 1 and 2 use the same subcarrier, such that inter-cell interference is generated while the interference signal of the second user terminal that is positioned in the adjacent cell 20 is transmitted to the central cell 10, a method of changing a pilot pattern according to an exemplary embodiment of the present invention will be described in detail with reference to FIGS. 3 to 7.

FIGS. 3 and 4 are diagrams illustrating a pilot pattern of an adjacent cell before a change and a changed pilot pattern, and FIGS. 5 to 7 are diagrams illustrating a changed pilot pattern of a user terminal that belongs to three adjacent cells.

In general, the pilot patterns allocated to the first and second user terminals 1 and 2 that uses the same subcarrier are the same. For example, the pilot patterns of the first and second user terminals 1 and 2 may have a structure in which four pilots having a value of 1 are allocated to the basic resource block as shown in FIG. 3. At this time, the transmitter of the second user terminal 2 that is positioned in the adjacent cell 20 changes the pilot pattern of the second user terminal 2 so as to have a pilot pattern that is orthogonal to the pilot pattern of the first user terminal 1.

For example, in the case when one second user terminal 2 influences the subcarriers allocated to the first user terminal 1 in the adjacent cell 20, the transmitter of the user terminal 2 can set values of two adjacent pilots on a frequency axis or a time axis to "1" and "−1", respectively, as shown in FIG. 4.

Then, the receiver of the base station 11 extracts the pilots loaded on the pilot subcarriers depending on the pilot patterns of the first and second user terminals 1 and 2 from the reception signal, and estimates channels of the transmission signals in the user terminals 1 and 2 by using the extracted pilots. At this time, the receiver of the base station 11 can estimate the channel with the user terminal 1 by adding the pilots in the two extracted pilot subcarriers and dividing the pilots by the pilot value of the user terminal 1, and can estimate the channel with the user terminal 2 by subtracting the pilots in the two extracted pilot subcarriers and dividing the pilots by the pilot value of the user terminal 2.

Further, in the case when the user terminal that is positioned in three adjacent cells adjacent to the central cell 10 influences the subcarriers allocated to the first user terminal 1, the transmitter of the user terminal that is positioned in three adjacent cells sets values of four pilots adjacent on the frequency axis and the time axis to "1, −1, 1, −1", "1, 1, −1, −1", and "−1, 1, 1, −1" to change the corresponding pilot patterns to be orthogonal to the pilot patterns of the first user terminal 1, as respectively shown in FIGS. 5 to 7.

Further, in the case when the user terminal that is positioned in seven adjacent cells adjacent to the central cell 10 influences the subcarriers allocated to the first user terminal 1, some of the transmitters of the user terminal that is positioned in seven adjacent cells may change values of the pilots and the others may change positions of the pilots to change the pilot patterns.

As described above, according to the exemplary embodiment of the present invention, the transmitter of the second user terminal 2 that is positioned in the adjacent cell 20 changes the pilot patterns of the second user terminal 2 in consideration of the number of user terminals are positioned in the adjacent cells, which influences the subcarriers allocated to the first user terminal 1, such that the receiver of the central base station 11 can estimate the channel with the first user terminal 1 and the channel with the second user terminal 2 positioned in the adjacent cell.

The receiver of the base station 11 reduces the interference signal of the second user terminal positioned in the adjacent cell 20 by using a channel estimation value of the second user terminal 2 positioned in the adjacent cell 20 from the reception signal, and detects the transmission signal of the first user terminal 1 from a signal from which the interference signal is reduced by using a channel estimation value of the first user terminal 1.

Meanwhile, the receiver of the base station 11 estimates the channel through orthogonal arrangement by using null among values of a plurality of pilots with respect to a multi-stream. For example, in the case of two streams, one stream estimates the channel by using the pilots allocated to some pilot subcarriers (i.e., pilot subcarriers positioned at both upper corners) among four pilot subcarriers shown in FIG. 3, and the other stream estimates the channel by using the other pilot subcarriers (i.e., pilot subcarriers positioned at both lower corners).

Therefore, in the case when the second user terminal 2 of the adjacent cell 20 transmits multi-streams, the values of the pilots allocated to some pilot subcarriers (i.e., pilot subcarriers positioned at both upper corners) among four pilot subcarriers shown in FIG. 3 are changed to "1, −1" with respect to one stream of two streams, and the values of the pilots allocated to the other pilot subcarriers (i.e., pilot subcarriers positioned at both lower corners) are changed to "1, −1" with respect to the other stream. That is, in the case of the multi-streams, a system in a single-stream is adopted.

Figure 10:
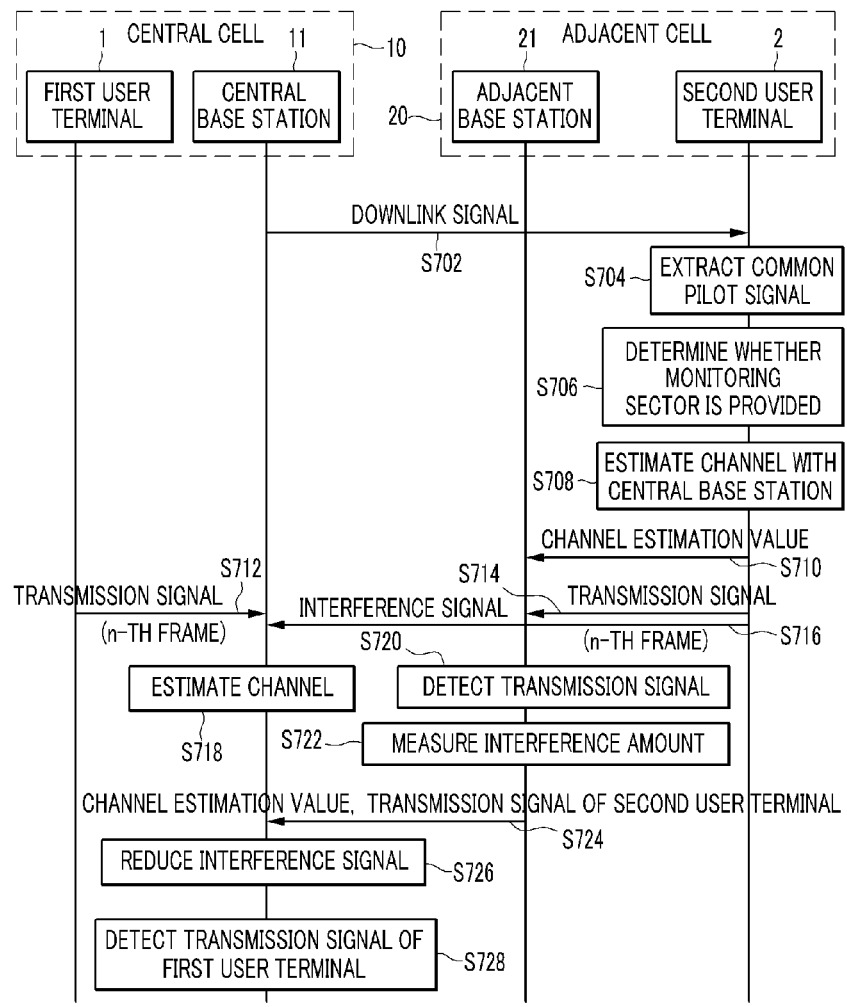

Next, a method of reducing interference signals caused by adjacent cells according to an exemplary embodiment of the present invention will be described in detail with reference to FIGS. 8 to 10. FIGS. 8 to 10 illustrate only one adjacent cell 20 for convenience, but the method will be hereinafter described assuming that the adjacent cell 20 is two or more adjacent cells.

FIG. 8 is a flowchart illustrating a method of reducing interference signals caused by adjacent cells according to a first embodiment of the present invention.

Referring to FIG. 8, a central base station 11 receives a transmission signal of a first user terminal 1 at an (n−1)-th frame (S502). Then, the central base station 11 measures an interference of a subcarrier allocated to the first user terminal 1 (S504), detects a subcarrier of which an interference is higher than a predetermined value, and transmits information on the detected subcarrier to an adjacent base station 21 (S506). At this time, a method of measuring the interference of the subcarrier may include methods of interference over thermal noise (IOT), signal to interference plus noise ratio (SINR), channel quality indicator (CQI), carrier to interference & noise ratio (CINR), etc.

The adjacent base station 21 requests feed-back information indicating a state of a channel from a second user terminal 2 that belongs to the corresponding base station (S508).

The second user terminal 2 measures the CQI at the request of the feed-back information (S510), and transmits a measurement value of the CQI to the adjacent base station 21 (S512).

The adjacent base station 21 transmits the received CQI measurement value of the user terminal 2 to the central base station 11 (S514).

The central base station 11 selects the second user terminal 2 having a CQI measurement value that is lower than a set value among the CQI measurement values of the second user terminal 2 that belongs to the adjacent cell 20 (S516), and transmits information of the selected second user terminal 2 to the adjacent base station 21 of the adjacent cell 20 to which the second user terminal 2 belongs (S518). At this time, the information of the second user terminal 2 may include the number of user terminals selected by the central base station 11 and identifier information of the user terminals selected by the central base station 11.

The adjacent base station 21 requests a change of a pilot pattern from the second user terminal 2 at an n-th frame (S520). At this time, the adjacent base station 21 transmits the number of user terminals selected by the central base station 11 to the second user terminal 2. Then, the second user terminal 2 changes its own pilot pattern to be orthogonal to a pilot pattern of the first user terminal 1 by considering the number of user terminals selected by the central base station 11 (S522).

The central base station 11 receives a transmission signal from the first user terminal 1 at the n-th frame. At this time, the central base station 11 receives a signal acquired by adding a transmission signal of the second user terminal 2, that is, an interference signal, to the transmission signal of the first user terminal 1 (S526 and S527).

The central base station 11 extracts pilots of the same subcarrier from the reception signal and estimates channels with the first and second user terminals 1 and 2 by using the extracted pilot (S528).

Thereafter, the central base station 11 reduces the interference signal of the second user terminal 2 by using the estimation values of the channels with the first and second user terminals 1 and 2.

For this, when receiving the transmission signal from the second user terminal 2 at the n-th frame (S528), the adjacent base station 21 extracts a pilot from a transmission signal from the second user terminal 2, estimates a channel of the transmission signal of the second user terminal 2 by using the extracted pilot, and detects the transmission signal of the second user terminal 2 by using the channel estimation value (S530). At this time, the adjacent base station 21 remeasures an interference of a subcarrier having a large interference at the n−1-th frame (S532). Herein, in the case when the interference of the corresponding subcarrier is small, the low interference indicates that the detected transmission signal of the second user terminal 2 is accurate. Therefore, when the interference of the corresponding subcarrier is small, the adjacent base station 21 transmits the detected transmission signal of the second user terminal 2 to the central base station 11 (S534). Meanwhile, the adjacent base station 21 can transmit a log-likelihood ratio (LLR) value or a hard-decision value for the transmission signal of the second user terminal 2 to the central base station 11 so as to detect the transmission signal of the second user terminal 2.

At this time, the central base station 11 reduces the interference signal from the signal acquired by adding the interference signal of the second user terminal 2 to the transmission signal of the first user terminal 1 by using the channel estimation value of the second user terminal 2 and the transmission signal of the second user terminal 2, which is received from the adjacent base station 21 (S536). The central base station 11 detects the transmission signal of the first user terminal 1 from the signal from which the interference signal is reduced by using the channel estimation value of the first user terminal 1 (S538).

Meanwhile, the central base station 11 reduces the interference signal from the reception signal of the n-th frame and remeasures an interference of the corresponding subcarrier, and may further increase the number of terminal users of the adjacent cell from which the interference signal will be reduced at a subsequent frame when the interference is still large.

Meanwhile, unlike the first embodiment of the present invention, the second user terminal 2 that belongs to the adjacent cell 20 can change the pilot pattern without a request for the change of the pilot. The embodiment will be described in detail with reference to FIGS. 9 and 10.

FIGS. 9 and 10 are flowcharts illustrating a method of reducing interference signals caused by adjacent cells according to second and third embodiments of the present invention.

Referring to FIG. 9, in the case when the interference signal of the second user terminal 2 positioned in the adjacent cell 20 is transmitted to a central cell 10, the second user terminal 2 can receive a downlink signal transmitted from the central base station 11. The downlink signal includes a common pilot signal such as a preamble or a midamble used for estimating the channel. The common pilot signal may be used for frequency offset and channel estimation as well as initial synchronization and cell searching.

The second user terminal 2 extracts the common pilot signal from the downlink signal (S602) when receiving the downlink signal from the central base station 11 (S601).

Further, the second user terminal 2 that belongs to the adjacent cell 20 determines whether or not a cell (hereinafter referred to as "monitoring sector") in which its own transmission signal can operate as the interference signal is provided at the n-th frame (S603) using the extracted the common pilot signal. At this time, the second user terminal 2 can determine whether or not the monitoring sector is provided by using a difference between distance between the second user terminal 2 and the central base station 11 and a distance between the second user terminal 2 and the adjacent base station 21, and can determined whether or not the monitoring sector is provided through measuring the CINR. For example, the second user terminal 2 may determine that the monitoring sector (that is, the central cell) is provided when the difference between the distance between the second user terminal 2 and the central base station 11 and the distance between the second user terminal 2 and the adjacent base station 21 is smaller than a predetermined value, and can determine that the monitoring sector (that is, the central cell) is provided even when the CINR measurement value is smaller than a reference value.

When it is determined that the monitoring sector (that is, the central cell) 10 is provided, the second user terminal 2 changes its own pilot pattern to be orthogonal to a pilot pattern of the first user terminal 1 that belongs to the monitoring sector (that is, the central cell) 10 (S604).

Thereafter, the second user terminal 2 transmits the change information of the pilot pattern to the adjacent base station 21 (S606), and the adjacent base station 21 transmits the change information of the pilot pattern of the second user terminal 2 and positional information of the used subcarrier to the central base station 11 (S608).

The central base station 11 receives the transmission signal from the first user terminal 1 at the n-th frame (S610). At this time, the signal received by the central base station 11 is a signal acquired by adding the transmission signal of the second user terminal 2, that is, the interference signal, to the transmission signal of the first user terminal 1 (S614 to S616).

The central base station 11 extracts pilots of the same subcarrier from the reception signal, and estimates channels with the first and second user terminals 1 and 2 by using the change information of the pilot pattern of the second user terminal 2 and the extracted pilot (S618).

Thereafter, the central base station 11 reduces the interference signal of the second user terminal 2 from the reception signal by performing the same steps as the steps S530 to S538 shown in FIG. 8 with the channel estimation values with the first and second user terminals 1 and 2, and detects the transmission signal of the user terminal 1 (S620 to S628).

Contrary to this, referring to FIG. 10, the second user terminal 2 extracts the common pilot signal from the downlink signal (S704) when receiving the downlink signal from the central base station 11 as shown in FIG. 9 (S702).

Further, the second user terminal 2 estimates a channel with the central base station 11 by using the extracted preamble (S708) when it is determined that the monitoring sector (that is, the central cell) 10 is provided by using the same method as shown in FIG. 9 (S706). Thereafter, the second user terminal 2 feeds back the channel estimation value with the central base station 11 to the corresponding adjacent base station 21 (S710).

The central base station 11 receives the transmission signal from the first user terminal 1 at the n-th frame (S712). At this time, in the case in which the second user terminal 2 that uses the same subcarrier as the first user terminal 1 transmits a transmission signal to the adjacent base station 21, the transmission signal of the second user terminal 2 is transmitted to the central base station 11. Therefore, the signal received by the central base station 11 is a signal acquired by adding the transmission signal of the second user terminal 2, that is, the interference signal, to the transmission signal of the first user terminal 1 (S716).

The central base station 11 extracts pilots from the reception signal and estimates the channel with the first user terminal 1 (S718).

Furthermore, when receiving the transmission signal from the second user terminal 2 at the n-th frame (S714), the adjacent base station 21 extracts a pilot from a transmission signal from the second user terminal 2, estimates a channel of the transmission signal of the second user terminal 2 by using the extracted pilot, and detects the transmission signal of the second user terminal 2 by using the channel estimation value (S720).

At this time, the adjacent base station 21 measures an interference amount of a subcarrier having a large interference amount at the n−1-th frame (S722). When the interference amount of the corresponding subcarrier is small, the adjacent base station 21 transmits the detected transmission signal of the second user terminal 2 to the central base station 11 (S724).

In addition, the adjacent base station 21 transmits the channel estimation values between the second user terminal 2 and the central base station 11, and the position information of the subcarrier allocated to the second user terminal 2 to the central base station 11 (S724).

Thereafter, the central base station 11 reduces the interference signal of the second user terminal 2 from the reception signal by using the channel estimation values with the first and second user terminals 1 and 2 (S726), and detects the transmission signal of the first user terminal 1 (S728).

The exemplary embodiments of the present invention are implemented through not only the apparatus and method, but may be implemented through a program that realizes functions corresponding to constituent members of the exemplary embodiments of the present invention or a recording medium in which the program is recorded. The implementation will be easily implemented by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting a signal of a terminal that belongs to an adjacent cell in a multicell communication system including a central cell and the adjacent cell adjacent to the central cell, comprising:
    allocating a plurality of first pilot signals in a plurality of pilot subcarriers, respectively;
    determining whether or not a transmission signal operates as an interference signal in the central cell;
    when the transmission signal operates as an interference signal in the central cell, changing the plurality of first pilot signals so as to be orthogonal to a plurality of second pilot signals allocated to a terminal that belongs to the central cell; and
    transmitting a transmission signal including the changed plurality of first pilot signals, wherein the terminal that belongs to the adjacent cell and the terminal which belongs to the central cell use the same subcarriers.

2. The method of claim 1, wherein the changing includes changing at least one of the plurality of first pilot signals.

3. The method of claim 2, wherein the plurality of second pilot signals are allocated in the plurality of pilot subcarriers, respectively.

4. The method of claim 1, wherein the plurality of first and second pilot signals are not 0.

5. The method of claim 1, wherein the determining includes receiving a request for changing the pilot pattern from a base station of the central cell.

6. The method of claim 1, wherein the determining includes measuring a carrier to noise and interference ratio (CINR), and
    determining that the transmission signal operates as the interference signal in the central cell when the CINR is smaller than a predetermined value.

7. The method of claim 1, wherein the determining includes comparing a difference between a distance between the adjacent cell and the terminal that belongs to the adjacent cell and a distance between the central cell and the terminal that belongs to the adjacent cell with a predetermined value, and
    when the difference between the distances is smaller than the predetermined value, determining that the transmission signal operates as the interference signal in the central cell.

8. A method of transmitting signals of a plurality of first terminals that each belong to a plurality of adjacent cells in a multicell communication system in which transmission signals of the plurality of adjacent cells operate as an interference signal in a central cell, comprising:
    changing first pilot signals allocated in pilot subcarriers so as to be orthogonal to second pilot signals allocated in the pilot subcarriers of a second terminal that belongs to the central cell; and
    transmitting the transmission signals including the changed first pilot signal,
    wherein a first user terminal of the plurality of first terminals and the second terminal use the same subcarriers.

9. The method of claim 8, wherein the changing comprises:
    changing the first pilot signals by some of the plurality of first terminals; and
    changing positions of the first pilot signals by the other first terminals of the plurality of first terminals.

10. The method of claim 9, wherein the first and second pilot signals are not 0.

11. A method of receiving a signal of a base station that manages a central cell in a multicell communication system in which interference is generated between the central cell and an adjacent cell adjacent to the central cell, comprising:
    receiving first pilot signals from a first user terminal that belongs to the central cell through at least one first pilot subcarrier;
    receiving second pilot signals from a second user terminal that belongs to the adjacent cell through at least one second pilot subcarrier; and
    estimating channels of signals transmitted from the first and second user terminals by using the first and second pilot signals, wherein the second pilot signals are orthogonal signals of the first pilot signals, and the first user terminal and second user terminal use the same subcarriers.

12. The method of claim 11, wherein the first and second pilot subcarriers are the same subcarrier.

13. The method of claim 12, wherein the first and second pilot signals have values other than 0.

14. The method of claim 11, further comprising:

receiving the signal from the first user terminal;

reducing an interference signal from the second user terminal from the reception signal by using a channel estimation value of the signal transmitted from the second user terminal; and detecting a signal from the first user terminal by using channel estimation values of the signal from which the interference signal is reduced and the signal transmitted from the first user terminal.

15. A method of receiving a signal of a base station that manages a central cell in a multicell communication system in which a signal of an adjacent cell adjacent to the central cell operates as an interference signal in the central cell, comprising:

receiving a first signal transmitted from a first user terminal that belongs to the central cell through a first basic resource block;

estimating channels with the first user terminal and a second user terminal that belongs to the adjacent cell by using the first signal;

receiving a second signal transmitted from the second user terminal through a second basic resource block from a base station of the adjacent cell;

reducing an interference signal caused by the second user terminal from the first signal by using the second signal and the channel estimation value with the second user terminal; and detecting the first signal from the signal from which the interference signal is reduced by using the channel estimation value with the first user terminal, wherein the first and second basic resource blocks uses subcarriers of which at least parts are the same and pilot signals allocated to the first and second basic resource blocks are orthogonal to each other.

16. The method of claim 15, further comprising requesting a change of the pilot signals to the second user terminal, wherein the second signal includes the changed pilot signal.

17. The method of claim 16, wherein the requesting includes measuring an interference of a plurality of subcarriers in the first basic resource block, and requesting the change of the pilot signals to the second user terminal when a subcarrier of which the measured interference is equal to or larger than a predetermined value among the plurality of subcarriers is allocated to the second user terminal.

18. The method of claim 16, wherein the pilot signals allocated to the first and second basic resource blocks have values other than 0.

19. The method of claim 1, wherein the first and second pilot subcarriers are the same subcarrier.

20. The method of claim 8, wherein the first and second pilot subcarriers are the same subcarrier.

* * * * *